F. SCHILLING, Sr.
TOGGLE BOLT.
APPLICATION FILED FEB. 26, 1919.
1,316,857.
Patented Sept. 23, 1919.
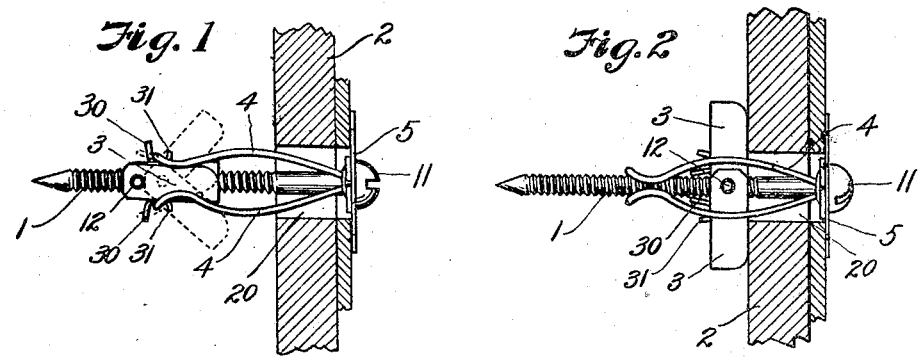
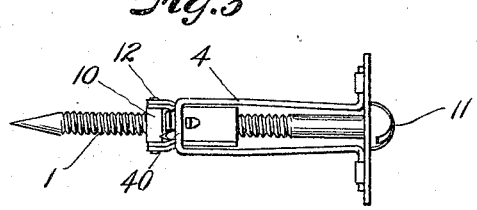
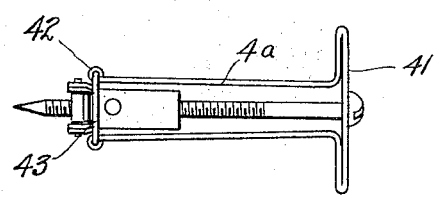
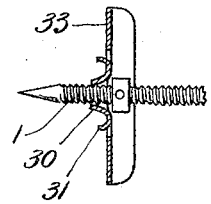
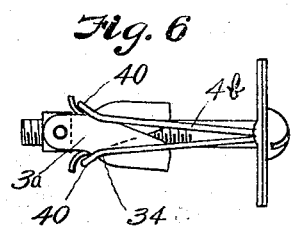
Inventor
FREDERICK SCHILLING Sr.
By Reynolds & Cook.
Attorney

UNITED STATES PATENT OFFICE.

FREDERICK SCHILLING, SR., OF SEATTLE, WASHINGTON.

TOGGLE-BOLT.

1,316,857.          Specification of Letters Patent.     Patented Sept. 23, 1919.

Application filed February 26, 1919. Serial No. 279,226.

*To all whom it may concern:*

Be it known that I, FREDERICK SCHILLING, Sr., a citizen of the United States, and resident of the city of Seattle, county of King, and State of Washington, have invented certain new and useful Improvements in Toggle-Bolts, of which the following is a specification.

My invention relates to bolts of the kind which are intended for being inserted through a body and are provided with expansible means carried by the inner end of the bolt and adapted to be passed through the bolt receiving hole and then expanded so as to engage the back surface of the body, this being done in cases where direct access to the back side of the body is impossible, as for instance in passing through the outer layer of a hollow wall. Such bolts are generically referred to as toggle bolts.

The object of my invention is to provide a bolt of this sort of an improved construction and particularly one in which it is possible, by suitable manipulation of the bolt, not only to expand the toggle members after they have been inserted through the hole, but one in which it is possible at any later time to close these members down alongside of the bolt, in such manner that they may be withdrawn.

The features of my invention which are novel and upon which I wish patent protection will be described in the specification and then particularly defined in the claims.

The accompanying drawings show my device in the forms of construction which are now preferred by me. This includes certain modifications of construction shown in different figures.

Figure 1 shows in full lines the position of the parts when the bolt is first inserted through the opening. The positions of the same parts are shown in dotted lines when the opening of the wing members has been well started.

Fig. 2 shows the same parts with the wing members fully opened and drawn down upon the inner or inaccessible side of the plate through which the bolt is placed.

Fig. 3 shows the device as illustrated in Figs. 1 and 2, but viewed from a different side.

Fig. 4 is a sectional view taken lengthwise of the two wings showing them in expanded position.

Fig. 5 shows one of the devices having a slightly modified type of construction.

Fig. 6 is a side view of another modified type of construction showing the wing members in closed position.

One of the objectionable features in the use of bolts of this general type, is that the wing members which are expanded to engage the inner surface of the plate through which the bolts are placed, cannot readily be again collapsed against the bolt so as to be withdrawn. It is one of the principal objects of my invention to provide a construction which is not only convenient to apply and which will securely hold the bolt, but one in which the wing members may again be collapsed so as to be withdrawn through the bolt receiving hole whenever desired.

The bolt 1 may be of any ordinary and suitable construction. The body or plate 2 through which the bolt is to be inserted, is provided with a hole 20 which, as is customary in using bolts of this character, is considerably larger than the shank of the bolt, to thus enable the passage of the wing, or bolt holding members.

Upon this bolt is mounted a nut 10. Upon this nut are pivotally mounted the two wing members 3. These are pivoted upon the pin 12. The wing members as herein shown, are made of sheet metal bent into a U-shaped cross section, so that they may be folded down against the shank of the nut and inclose the same. This shape is one which is strong to resist the pull of the bolt and at the same time may be collapsed together so as to be of relatively small cross sectional area, thus being capable of being passed through a comparatively small hole.

The connecting web 33 of each of these wing members, has two ears or arms, 30 and 31, cut therefrom and projecting outwardly. Obviously these might be formed in other ways than by cutting them from the metal of the parts, but that would be an obvious equivalent to this method of construction. These two arms 30 and 31, are comparatively close together and adjacent to the pivoted end of the wings.

Two resilient or spring arms 4 are provided, these extending from a base, as a plate 5, which has a hole for the passage of the bolt and which serves as a washer, or cover, for the outer end of the hole 20 and a support for the bolt head. These spring arms 4 extend inward and are provided with a transversely extending part 40 which extends across the outer surface 33 of the wings.

Each wing is provided with its bar 4. The transversely extending part 40 is located between the arms 30 and 31 carried by the wings. As shown in Figs. 1, 2 and 3 these parts 4 are made of bent wire. They are secured to the base 5 in such a way that their outer ends exert a slight inward pressing action upon the wings 3, so as to always bear lightly against their outer surfaces.

With the wings collapsed, or in the position shown by full lines in Fig. 1, the bolt may be inserted through the hole 20. The grip of the arms 4 against the wing members prevents them from turning and these, being pivoted upon the nut, will prevent the nut from turning. If, however, the bolt be turned in such a manner as to draw the nut outwardly, or toward the head, the engagement of the arms 30 with the transverse bar 40 of the arms 4, will cause the wings 3 to be swung outwardly, or expand after the manner indicated by dotted lines in Fig. 1, until they finally assume the transversely extending position shown in Fig. 2. They cannot swing in the same direction any farther, by reason of the fact that the arms 30 will engage the sides of the bolt 1 and prevent further movement. In this expanded position their outer ends extend beyond the margins of the hole 20 and provide a secure bearing support for the wings against the inner surface of the plate 2.

If it be desired to remove the bolt, it is only necessary to turn the bolt so as to force the nut inward. The nut will then eventually engage the transversely extending bar 40 of the arms 4. This will cause the wings to be swung upon the pivots 12 so as to collapse them and cause them to embrace the shank of the bolt. They will thus be caused to assume the position shown by full lines in Fig. 1, in which position they may be withdrawn through the hole 20. It is thus possible to remove the bolt at any time desired without injuring any of its parts and leaving these parts in such shape that they may be again inserted in the hole and secured in place.

Fig. 5 shows a side view of a construction in which the arms 4ª are made of a flat strip of metal and the part 5 which engages the outer surface of the plate 2 or of the object which is to be secured thereto, is formed by folding this bar so as to form the loops 41. With this type of construction the inner ends of the arms 4 are provided with eyes 42 which receive a link or loop 43 which extends transversely and engages the ears 30 and 31 of the wings to cause them to open or collapse, as the case may be.

In Fig. 6 a slightly modified construction is shown which employs arms 4ᵇ, essentially the same in construction as shown in Figs. 1 and 2. The wings 3ª are however slightly modified in construction. In this case the wings are provided with an inclined outer surface 34, which forms a substitute for the outermost arm 31. The transversely extending bar 40 of the arms engaging this inclined surface 34, serve to swing the same into collapsed position. It is believed that the operation of this device has been made clear and further statement of the manner of its operation is unnecessary.

What I claim as my invention is:

1. In a toggle bolt, in combination, a bolt, a nut, two wings pivoted on the nut, and controlling bars extending alongside of the bolt and adapted to engage said wings to swing them both outwardly and inwardly by traversing of the nut along the bolt in opposite directions.

2. In a toggle bolt, in combination, a bolt, a nut, two wing members pivoted upon the nut and having arms adapted to engage the bolt when the wings are extended outwardly from the bolt, and controlling rods extending from the bolt head alongside of the bolt and adapted to engage the opposed faces of said arms to secure swinging of said wings as the nut is traversed along the bolt.

3. In a toggle bolt, in combination, a bolt, a nut, two wings pivoted upon the nut and having two arms extending outwardly from the rear side thereof, one of these being adapted to engage the bolt when the wings are swung outward, and spring arms extending alongside of the bolt and each having a laterally extending part rearwardly of the wings and adapted to enter between said arms to thereby positively swing the wings in either direction when the nut is traversed along the bolt.

4. In a toggle bolt, in combination, a bolt, a nut therefor, two wings pivoted on the nut and having two arms projecting outwardly from their rear sides adjacent their pivots, a plate fitting under the head of the bolt and arms extending from said plate alongside of the nut and carrying means adapted to extend between said arms of the wings to positively swing the wings upon their pivots by the traversing of the nut upon the bolt.

Signed at Seattle, Washington, this 21st day of February, 1919.

FREDERICK SCHILLING, Sr.